UNITED STATES PATENT OFFICE.

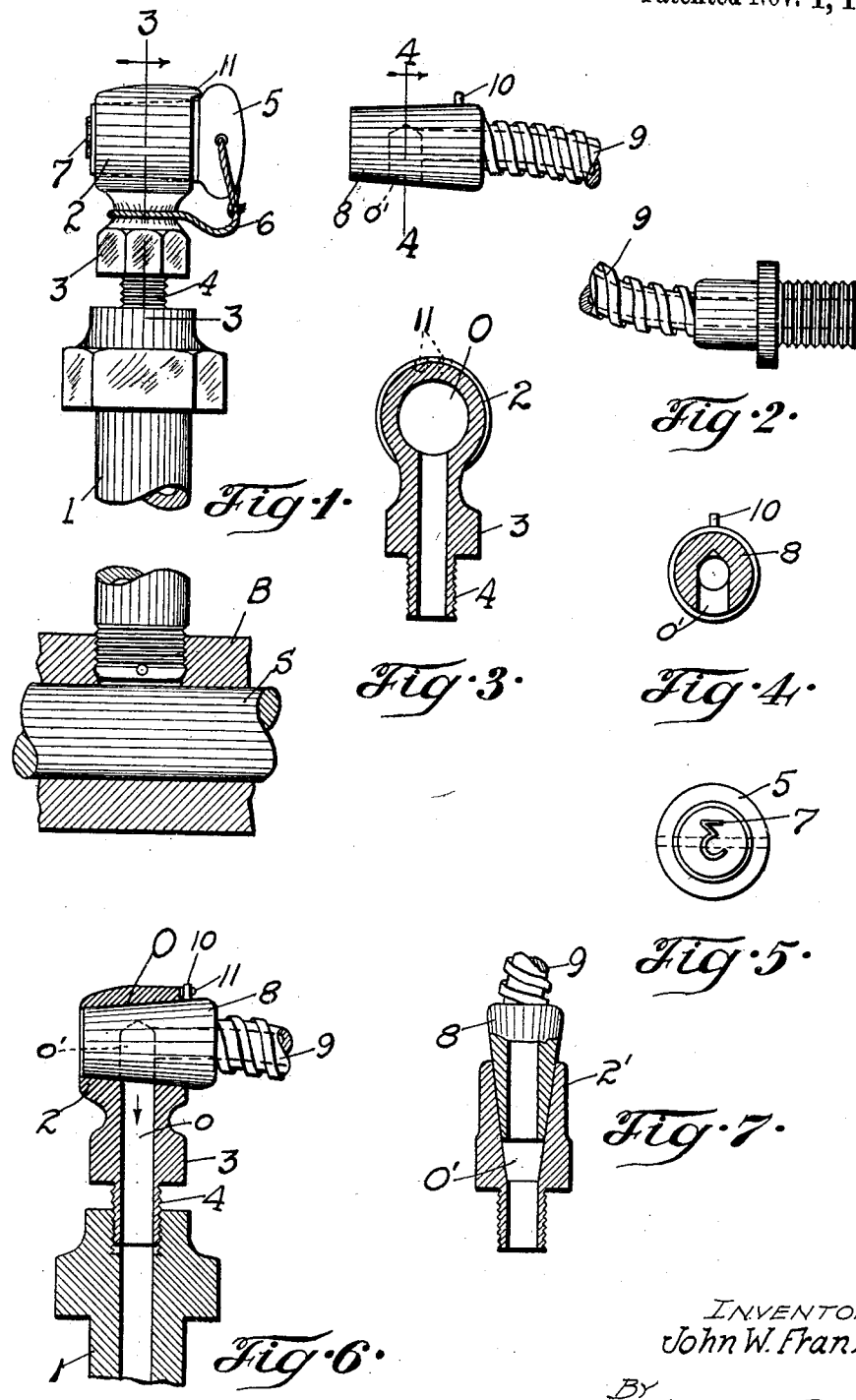

JOHN WM. FRANZ, OF ST. LOUIS, MISSOURI, ASSIGNOR OF ONE-HALF TO EDWIN A. HOFFMANN, OF ST. LOUIS, MISSOURI.

GREASE AND OIL CUP.

1,395,406.         Specification of Letters Patent.       Patented Nov. 1, 1921.

Application filed January 28, 1921. Serial No. 440,677.

*To all whom it may concern:*

Be it known that I, JOHN W. FRANZ, a citizen of the United States, residing at St. Louis, State of Missouri, have invented certain new and useful Improvements in Grease and Oil Cups, of which the following is a full, clear, and exact description, reference being had to the accompanying drawings, forming a part hereof.

The present invention has relation to improvements in grease and oil cups, and consists in the novel details of construction more fully set forth in the specification and pointed out in the claims. The object of the invention is to provide a grease cup having a closure plug carrying on one of its faces a suitable number or notation in the shape of type that may be used for making an impression on a tally sheet at the time the cup is supplied with grease in order that a record may be had of the incident of thus replenishing the grease in said cup. In garages where a large number of automobiles are kept it is the practice at certain predetermined periods to systematically supply with grease or oil all of the lubrication cups on each automobile. Because of the large number of such cups on each machine, it is very often the case that one or more are overlooked, thereby giving rise to future trouble and annoyance. It is the object of the present invention to provide a new form of grease cup such as above alluded to, whereby a record may be made at the time each cup is replenished, which record on inspection will show immediately whether or not all the grease cups have been attended to. The details of my invention and the manner of applying the same will be better apparent from a detailed description of the invention in connection with the accompanying drawings in which—

Figure 1 is a side elevation of my improved grease cup and its connection with the bearing. Fig. 2 is a side elevation of the flexible tube of a grease gun adapted to coöperate with my improved grease cup. Fig. 3 is a vertical cross section on the line 3—3 of Fig. 1 with the closure plug of the cup removed. Fig. 4 is a cross section on the line 4—4 of Fig. 2. Fig. 5 is an end elevation of the grease cup plug. Fig. 6 is a middle longitudinal section through the grease cup with the grease gun applied, the terminal portion of the gun only being shown, and Fig. 7 is a vertical section through a modified form of cup with the gun applied.

Referring to the drawings S represents a shaft mounted in a bearing B into which is screw-threaded a pipe 1 in which is secured my improved grease cup 2. The grease cup 2 is provided with a hexagonal portion 3 from which extends a hollow threaded stem 4 whereby the grease cup may be secured in place. The cup 2 is provided with a slightly tapering opening O with which communicates a passageway $o$ leading to the part that it is desired to lubricate. A plug 5 is adapted to fit into the opening O of the cup and close the same against the admission of foreign matter, the plug 5 in the present case taking the place of the customary cup cap or lid. In order to guard against accidental displacement and subsequent loss of the plug 5, the same may be secured to the cup 2 by means of a cord or wire 6 as shown in Fig. 1. The small end of the plug 5 carries a type 7, it being understood that all of the plugs on any one automobile will carry different type so that each cup may be positively identified by its own numeral or other notation. In the present case the cup illustrated would be No. 3 since the plug of this cup carries the numeral 3. When it is desired to replenish the supply of grease in the cup 2 the plug 5 is removed in order that the nozzle 8 on the flexible tube 9 of a grease gun (not shown) may be inserted in the opening O of the cup. Upon operating the grease gun the grease will be forced into the passage $o$ from a passage $o'$ in the nozzle 8 and the shaft S thus supplied with lubrication. In order that the nozzle 8 may always be inserted in the cup 2 so that the passages $o$ and $o'$ will register, a pin 10 is secured into the nozzle and a pair of lugs 11, 11 are formed on the upper edge of the cup, and when the operator inserts the nozzle into the cup he turns it to a position that will enable the pin 10 to enter the recess between the lugs. The gun may now be operated as the passages $o$ and $o'$ are in register.

Either before or after applying the grease gun to the cup the operator using the plug 5 as a stamp, makes an impression on a record sheet, provided for the purpose, of the type carried by said plug. Owing to the fact that the grease cup and plug are more or less covered with grease at all times, a perfectly legible impression may be made without the use of ink as the grease covering the numeral 7 serves the purpose. An impression of the type on every plug is made on the sheet at the time the plug is replenished, consequently if the operator neglects to supply any particular plug with grease his record sheet will fail to show a record of this plug, consequently an examination of the sheet makes it a simple matter to discover if all the cups have been replenished.

In Fig. 7 I show a modified form of cup 2' provided with a vertically disposed chamber O' into which the nozzle 8 is inserted for replenishing the cup. After the cup has been filled with grease a plug similar to plug 5 may be inserted into the chamber O' in order to close the same.

From the foregoing it will be seen that I have provided a grease cup, the closure plug of which may be availed of for the purpose of recording each operation of supplying the cup with grease, and the details of the present invention are susceptible of modification without departing from the spirit of the same.

Having described my invention, I claim:

1. A grease cup provided with a closure plug, one face of said plug carrying a type.

2. A grease cup provided with an opening, a plug adapted to be inserted in said opening and an impression device on said plug.

3. In combination with a lubrication cup provided with a tapered opening adapted to receive the nozzle of a grease gun, a closure plug for said opening when the grease gun is not in use, said plug having a type on its flat face.

In testimony whereof I affix my signature.

JOHN WM. FRANZ.